J. M. TOPPER.
POINT PROTECTOR FOR IMPALING INSTRUMENTS.
APPLICATION FILED OCT. 9, 1913.
1,105,384.
Patented July 28, 1914.
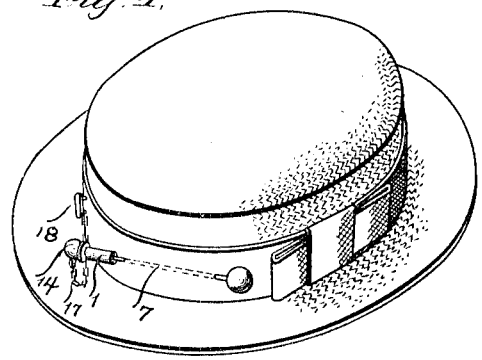
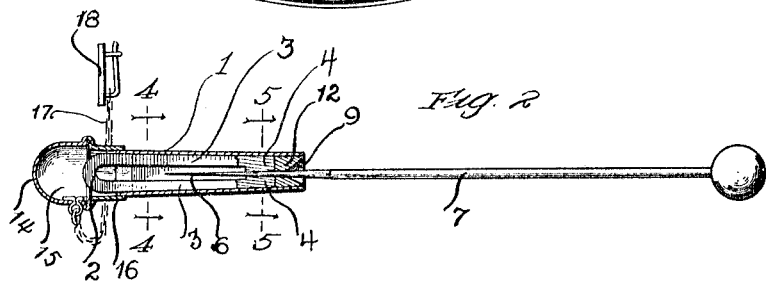
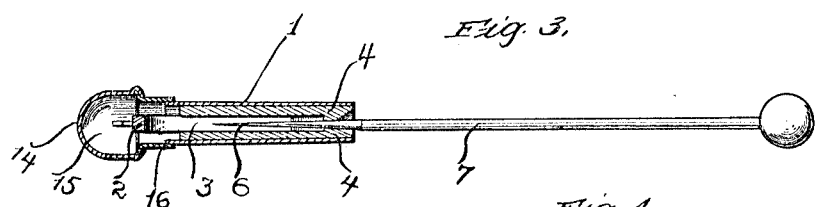
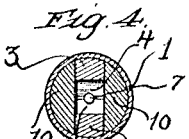 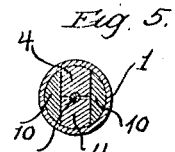
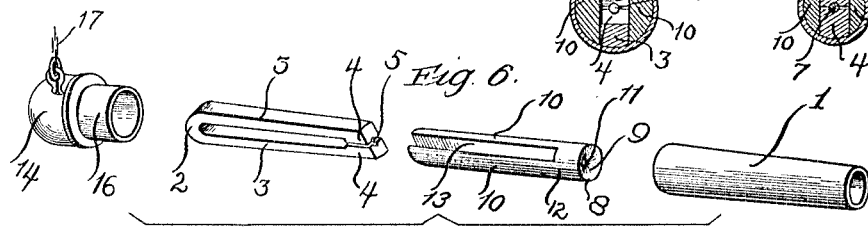
Witnesses
Inventor
Jacob M. Topper
By Knight Bros
Attorneys

UNITED STATES PATENT OFFICE.

JACOB M. TOPPER, OF CORSICA, PENNSYLVANIA.

POINT-PROTECTOR FOR IMPALING INSTRUMENTS.

1,105,384.  Specification of Letters Patent.  Patented July 28, 1914.

Application filed October 9, 1913. Serial No. 794,274.

*To all whom it may concern:*

Be it known that I, JACOB M. TOPPER, a citizen of the United States, residing at Corsica, in the county of Jefferson and State of Pennsylvania, have invented certain new and useful Improvements in Point-Protectors for Impaling Instruments, of which the following is a specification.

This invention relates to point protectors for impaling instruments, such as hat pins or the like, and has for one object to provide a suitable frictional grip, to which end one feature of the invention relates to a pair of resilient jaws between and in contact with which the point may slide; said jaws being carried by the arms of a horseshoe magnet and having their gripping faces extending transversely of the magnetic flux and thereby adapted to increase friction upon the pin by drawing the jaws together.

Another object relates to increasing efficiency of the resilient magnetic gripping jaws, and to this end a further feature of the invention consists in providing the ends of the magnetic arms with enlargements extending in the direction of the gripping faces and thereby serving the dual purpose of localizing the magnetic flux in the direction of greatest efficiency in drawing the resilient jaws together, and consequently increasing the friction upon the interposed pin.

In the drawings:—Figure 1 is a perspective view of a hat showing a hat pin used in connection therewith and having my invention applied thereto; Fig. 2 is a central longitudinal section in the plane of the magnetic friction grip; Fig. 3 is a similar view in a plane at right angles thereto; Fig. 4 is a central vertical section on the line 4—4 of Fig. 3; Fig. 5 is a similar section on the line 5—5 of Fig. 3; Fig. 6 is a perspective view of the several parts as dissembled.

Referring to the drawings in detail, 1 designates a casing which is constructed to receive a horse shoe or U-shaped magnet 2. The magnetic friction grip 2 is constructed with two poles 3 with enlarged ends 4 providing gripping jaws in the opposed faces of which are formed longitudinal recesses or grooves 5, in which the pointed end 6 of the hat pin 7 may slide; these enlargements extending in the direction of the pin to be gripped and transversely to the magnetic flux so as to provide a path for the latter that will insure its greatest efficiency in drawing the resilient jaws together upon the pin; and the longitudinal recesses or grooves 5 not only increasing the surface of frictional contact with the pin, but permitting the poles to approach more closely together and proportionally reduce the air gap.

8 designates an insert or guide which is constructed to lay within the casing 1 with its cupped socket 9 presented at the end of the casing and its two opposed longitudinal tongues 10 overlying the inter pole space of the magnet and abutting against the inner sides of the casing. The cupped socket 9 of the guide 8 is provided with an axial bore 11, which extends through the solid end 12 thereof to the slot 13, between the two opposed tongues 10.

14 designates a cap which is provided with a hollow dome 15 and an annular sleeve 16.

The guide 8 conforms to and fits tightly within the casing being introduced from the rear end; while the magnet fits firmly between the longitudinal tongues of said guide, and is held in position thereby, with the grooves of the gripping jaws in alinement with the perforation of the guide. The magnet may fit the diameter of the casing particularly at the rear end. A cap 14 having a dome 15 and embracing sleeve 16 may be employed to close the rear end of the casing, and afford anchorage for the safety chain 17 carrying the anchoring pin 18.

I claim:

1. A hat pin protector having a gripping member comprising a horseshoe magnet constructed with resilient arms having at their ends opposed, frictional pin-gripping faces adapted to be drawn toward each other by their inherent magnetism, and thereby cause increased frictional bearing upon an intervening pin.

2. A hat pin protector having a gripping member comprising a horseshoe magnet constructed with resilient arms having at their ends opposed, frictional pin-gripping faces adapted to be drawn toward each other by their inherent magnetism, and thereby cause increased frictional bearing upon an intervening pin; said arms being enlarged at their gripping ends and in the direction of their gripping faces and transversely to the lines of magnetic flux, whereby to localize the magnetic circuit in the direction which increases the gripping efficiency of the arms.

The foregoing specification signed at Corsica, Pa., this 18th day of Sept., 1913.

JACOB M. TOPPER.

In presence of two witnesses—
R. R. SNYDER,
J. H. MOORE.

---

Copies of this patent may be obtained for five cents each, by addressing the "Commissioner of Patents, Washington, D. C."